(12) United States Patent
Given

(10) Patent No.: US 6,282,655 B1
(45) Date of Patent: Aug. 28, 2001

(54) KEYBOARD MOTION DETECTOR

(76) Inventor: Paul Given, 2504 S. Fenton La., Lakewood, CO (US) 80277

( * ) Notice: Subject to any disclaimer, the term of this patent is extended or adjusted under 35 U.S.C. 154(b) by 0 days.

(21) Appl. No.: 09/414,732

(22) Filed: Oct. 8, 1999

Related U.S. Application Data

(60) Provisional application No. 60/135,807, filed on May 24, 1999.

(51) Int. Cl.[7] ...................................................... G06F 11/30
(52) U.S. Cl. ............................................. 713/200; 340/540
(58) Field of Search ...................................... 713/200, 201, 713/202, 300, 320, 323; 340/541, 540; 348/143, 155, 156, 634; 382/107

(56) References Cited

U.S. PATENT DOCUMENTS

| | | | |
|---|---|---|---|
| 5,202,929 | * | 4/1993 | Lemelson ................................ 382/116 |
| 5,281,961 | * | 1/1994 | Elwell ..................................... 340/825 |
| 5,544,321 | * | 8/1996 | Theimer et al. ....................... 709/226 |
| 5,548,660 | * | 8/1996 | Lemelson ............................... 382/116 |
| 5,555,376 | * | 9/1996 | Theimer et al. ....................... 709/229 |
| 5,635,905 | * | 6/1997 | Blackburn et al. .................... 340/555 |
| 5,835,083 | * | 11/1998 | Nielson et al. ........................ 345/211 |
| 5,926,404 | * | 7/1999 | Zeller et al. ........................... 713/321 |
| 5,958,055 | * | 9/1999 | Evoy et al. ............................ 713/310 |
| 5,960,085 | * | 9/1999 | De La Huegra ...................... 713/182 |
| 6,002,427 | * | 12/1999 | Kipust .................................... 348/156 |

\* cited by examiner

Primary Examiner—Norman M. Wright
Assistant Examiner—Christopher Reyak
(74) Attorney, Agent, or Firm—Harold A. Burdick

(57) ABSTRACT

The invention is a computer interface utilizing a sensor for sensing that a user is in the immediate vicinity of the computer. The interface consists of a motion sensor, computer software for enabling the computer security in the absence or presence of a user, a keyboard interface connected to the motion sensor and a keyboard connected to the keyboard interface.

14 Claims, 1 Drawing Sheet

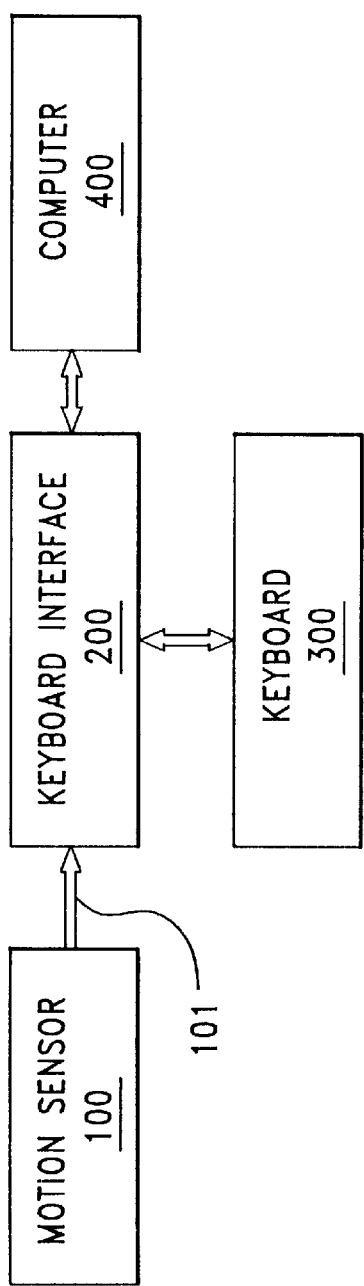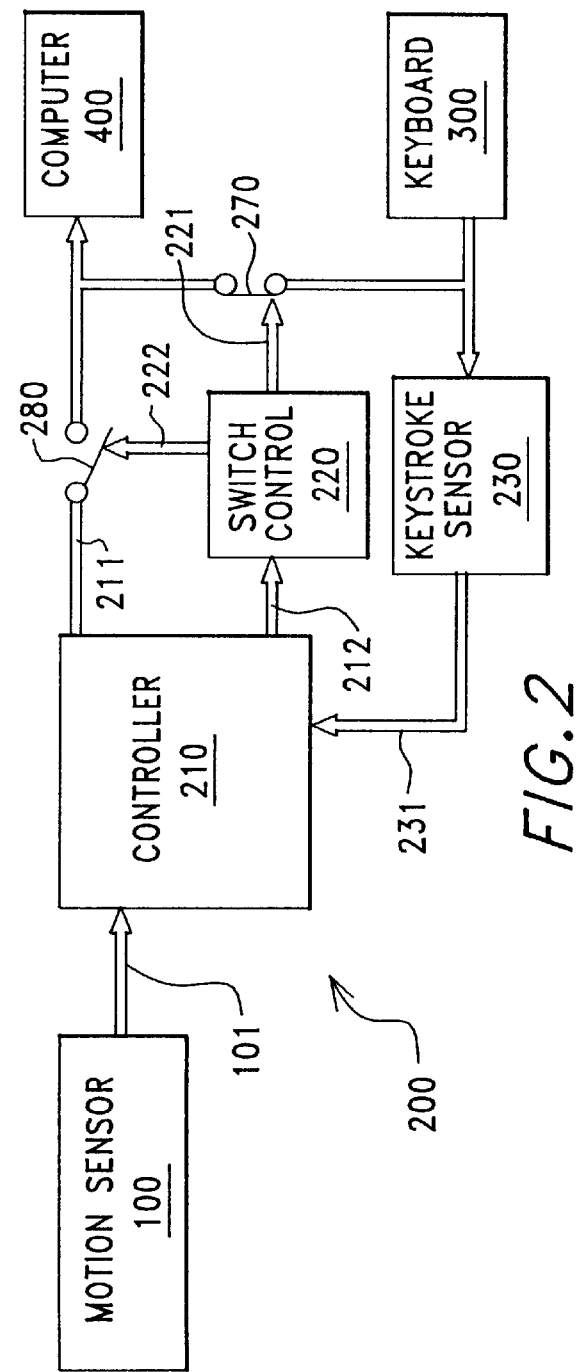

KEYBOARD MOTION DETECTOR

This is a Continuation-In-Part of Provisional Ser. No. 60/135,807, Filed May 24, 1999.

BACKGROUND OF THE INVENTION

1. Field of the Invention

The invention relates to computers, and more specifically, the invention relates to a computer interface which utilizes a motion sensor that senses that the user is in the immediate vicinity of the computer.

2. Description of the Prior Art

Computer security is of great concern to businesses which are increasingly relying on the efficiency of computers to operate the businesses. On the other hand, competitors, disgruntled employees, computer hackers and others are a constant threat to the security of the computer's data base.

Several prior art devices have attempted to solve this security problem. U.S. Pat. No. 5,281,961 to Elwell discloses a ceiling sensor to interface with the computerized controllers of energy management systems. This ceiling is operable to detect motion through the use of a transmitted signal of predetermined frequency, which when received, has experienced a Doppler shift. Comparison of the received signal with its frequency change to the transmitted signal produces motion detection which when incorporated with an isolated latching relay enables the switching on and off of light, heating, air conditioning or security interfaces. A method of fabricating a ceiling sensor for a computer controller interface is also described.

U.S. Pat. No. 5,635,905 to Blackburn et al discloses a system for detecting the presence of a human who may be observing an artifact which is within his or her line of sight or field of view. The system includes a laser with a lens at the output and which is triggered rapidly in order to produce a pulsed beam having divergent rays of visible or invisible infrared light which irradiates an are to be examined for the presence of an observer. The light reflected from individuals and objects in the area is reflected into a pair of vision devices or pair of vision assemblies the output of which are fed into a computer. The computer has software programs which utilize vision device output data to the intensity and location of the light pixels in the image thereof to detect the presence and orientation of the eyes of an individual in the area based on the light pixel intensity and location data.

The above patents are the closest prior art found that showed motion detectors related to computer operation.

SUMMARY OF THE INVENTION

The invention consists of a keyboard interface which utilizes a motion detector that senses that the user is in the immediate vicinity of the computer. The invention may be implemented with an infrared motion detector aimed at a desired location in front of the computer terminal or some other device such as a micro-switch in the user's chair for example. The keyboard interface can then act by sending an artificial "keystroke" in the same manner as a keyboard signal that would prevent the enabling of the computer's security (for example, a password protected screen saver), in one embodiment. Another embodiment might have the keyboard interface send a signal when the motion detector detects the absence of a person, thereby signaling for immediate enabling of the computer's security software.

BRIEF DISCUSSION OF THE DRAWINGS

FIG. 1 is a flow diagram of an overview of the motion detector in accordance with the invention.

FIG. 2 is a flow diagram of the keyboard interface detail in accordance with the invention.

DETAILED DESCRIPTION OF THE PREFERRED EMBODIMENT

Referring to FIG. 1, an overview of the keyboard motion sensor 100 is shown. FIG. 2, is a detailed flow diagram of the keyboard interface 200. The motion sensor 100 senses the user is in the immediate vicinity of the computer. This device may be implemented with an infrared motion detector aimed at a desired location of the computer terminal, for example (or a micro-switch in the user's chair, for that matter). Upon sensing a person in the vicinity of the computer's keyboard or monitor, the motion sensor 100 will send a signal to the keyboard interface 200. The keyboard interface 200 can then act by sending an artificial "keystroke" in the same manner as a keyboard signal that would prevent the enabling of the computer's 400 security software (for example, a password protected screen saver), in one embodiment. Another embodiment might have the keyboard interface 200 send a signal when the motion detector detects the absence of a person, thereby signaling for immediate enabling of the computer 400 security software.

The keyboard interface 200 is the controller for this invention. When the user is typing on the keyboard 300, the keyboard interface 200 senses the keystroke via the keystroke sensor 230. The keystroke sensor 230 holds the keystroke sensor line 231 in the logical "true" level to indicate to the controller 210 that the user is typing on the keyboard 300, hence the user is present at the computer terminal. In addition, the motion detector sensor 100 is sending logical "true" pulses via the motion sensor line 101 to the controller 210. Because the user is typing on the keyboard 300, the switch control 220 will keep switch 270 closed and switch 280 open. This will allow for normal keyboard traffic between the keyboard 300 and the computer 400. When the user has stopped typing the keystroke sensor 230 will send a logical "false" level to the controller 210 after a predetermined period of time. In one embodiment, the value of this delay time can be set by the user into the delay timer of the keystroke sensor 230.

In another embodiment, this time can be pre-programmed to a default at the time of manufacture. If the reason for lack of keyboard activity is that the user has left the area of the computer terminal, the controller 210 leaves switch 270 closed and switch 280 open. The computer 400 will then go into a lock mode according to security software that is running on the computer 400 (typically a screen saver). However, if the user is still in the immediate vicinity of the computer terminal, but just not typing on the keyboard 300 at the time, then the motion sensor 100 will detect the presence of the user and send logical "true" pulses to the controller 210 via line 101. Upon sensing the pulses from the motion sensor 100, the controller 210 will open switch 270 and close switch 280. This disconnects the keyboard 300 from the computer 400 and connects the controller 210 to the computer 400. The controller 210 then sends a harmless keystroke, for example, SHIFT then BREAK SHIFT, to the computer. This controller 210 generated "keystroke" tells the security software on the computer 400 that the user is still near the terminal and that it should not lock the terminal.

An alternative use for the invention is, that as soon as the user leaves the immediate vicinity of the computer 400, the motion sensor 100 senses the absence of the user and the controller 210 immediately sends a command sequence to the computer 400 to put it into a security shutdown mode (such as enabling workstation lockup with a password protected screen saver).

The invention may have at least three distinct modes of operation:
1. a mode where periodically an unobtrusive keystroke can be sent only as long as the detector senses the presence of a person at the workstation;
2. a mode where a series of keystrokes are sent (after an optional timing period) to the workstation to immediately lock it down should the detector sense the lack of a person at the workstation.; and
3. to particularly send an unobtrusive keystroke whether or not a person is at the workstation. This last mode may be of interest to the home computer market where a user does not want a remote connection timed out because the user left the area temporarily (for example, an internet connection could remain active while the user takes a personal break away from the workstation).

Another aspect of the invention is that the device may either be manufactured to exclusively perform one of the above functions, or their functions could be embodied in one device that is programmable to operate in any one of the above described modes. Programming could be accomplished through hardware switch settings, or come through the keyboard or computer to which it interfaces. Programming would not only include which mode, but could also include which keystroke would represent the unobtrusive keystroke described above (default to shift enable, shift disable perhaps), changes to default timing parameters between keystrokes, and for mode 2) above which keystrokes are necessary to accomplish workstation lock up. The invention might include, in one embodiment, two LEDs to represent which one of the three modes which it is currently operating in (or in the "off" or disabled state). No LED lit means the invention is off-line, out of the loop, or otherwise disabled and is not functionally operational while allowing normal keystroke operations, left LED alone lit means the invention is operating in mode 1) described above, right LED alone lit means the invention is operating in mode 2) described above, and both LEDs lit means the invention is operating in mode 3) described above.

In another embodiment, another LED of perhaps a different color, could blink on momentarily every time a keystroke is being automatically sent thus giving the user some assurance that the device is working.

Another embodiment of the invention may be known by the name Infrared Control Unit (ICU). One possible implementation of the ICU is to implement it with a cheap programmable microprocessor using non-volatile memory to save user settings when power is removed. The ICU could be programmed from a system command file at power-up time with all the user options. Such a command file can be tailored to user preferences employing an ordinary editor on a provided program template during initial installation or at any time afterwards. The ICU would come with factory defaults should the user not want to bother with programming it.

Another improvement for the ICU would include a soft sonic alert when the ICU is either getting ready to issue instructions to the system box to engage the screen saver, or when enough time has elapsed that the screen saver activation is near. This could be done in both of two operational modes: OM1-keep screen saver away while user is present; and OM2-engage lockup as soon as the user leaves the area. For OM1, a user could be perfectly still while sitting at the terminal and reading, for example, making it difficult for a motion detector to recognize the presence of the user. If the ICU has not detected motion for perhaps 55 (user programmable) seconds (the lowest keyboard inactivity timeout value for a screen saver in Windows98 is 60 seconds) it could issue a sonic alert. This very act would cause the quiet reader to look up momentarily, providing just enough motion for the ICU to reset the keyboard inactivity timer by sending a keystroke to the system box. For OM2, the sonic alert could serve as a reminder that, in say 5 (user programmable) seconds, the terminal will be locked up with the password protected screen saver. If ICU is implemented with a microprocessor as previously discussed, the timing function should provide no real obstacle. From previous work, it is known that some sonic alert modules are available in a variety of functional parameters including price and loudness. Activation of the "sonic reminder" could be another parameter that the user could set up as an option when the ICU is first installed.

In another embodiment, any proximity detector, that is, the utilization of a proximity detector of any type, including a thermal detector, not just a motion detector, to control the screen saver as per previous descriptions may be used. This would include, but not be limited to, such commercially available devices as a radio transmitter and receiver combination, one on the user and one at the terminal, so that when the separation between the two becomes great enough, the screen saver would be invoked. There are also commercially available and commonly used in building security where a person is allowed into the building whenever his badge (containing a passive transponder) is passed near to a transmitter typically at the building entrance. Such an arrangement could be transferred for use to enable a screen saver when a badge carrying user moves far enough away from the terminal. Other like proximity detectors whether modified by some method of encoding to detect a particular user or just any user could be made to serve the purpose of securing a computer terminal.

Thus it will be appreciated that the present invention provides a novel computer interface that senses that the user is in the immediate vicinity of the computer. It is contemplated that other embodiments and/or modifications may be made in the present invention without departure from inventive concepts manifested by the disclosed embodiments. It is expressly intended, therefore, that the foregoing description is illustrative only of preferred embodiments, not limiting, and that the true spirit and scope of the invention be determined by reference to the appended claims.

What is claimed is:

1. A computer interface for use with a computer including security software normally operational to secure the computer when no user input to the computer occurs for a period of time, said computer interface comprising:

sensing means for sensing presence or absence of a user in the immediate vicinity of the computer and for providing proximity signals pertaining to the presence or absence of the user;

keyboard interface means connected with said sensing means and the computer for processing said sensing means proximity signals and selectively providing an artificial keystroke signal, said keyboard interface means including a controller receiving said proximity signals from said sensing means and generating said artificial keystroke signal, a user data input sensor connected with said controller, and switching means connected with said controller for directing user data input signals to the computer or said artificial keystroke signal from said controller to the computer; and keyboard means connected with said user data input sensor and said switching means of said keyboard interface means for accommodating data input signals to the computer by the user;

whereby normal operation of the security software is accommodated when both a lack of data input signals by the user at said keyboard means is sensed by said user data input sensor and absence of the user in the vicinity of the computer is sensed by said sensing means, but whereby prevention of enablement of normal operation of the security software is effected in the sensed absence of data input signals by the user at said keyboard means if presence of the user in the vicinity of the computer is sensed thus eliciting periodic controller generation of said artificial keystroke signal and direction thereof to the computer by said switching means.

2. A computer interface in accordance with claim 1 wherein said sensing means consists of a proximity detector.

3. A computer interface in accordance with claim 2 wherein said proximity detector is an infrared motion detector.

4. A computer interface in accordance with claim 2 wherein said sensing means consists of a thermal detector.

5. A computer interface in accordance with claim 1 wherein a settable delay timer mounted in said computer interface controls delay time of said user data input sensor.

6. A computer interface in accordance with claim 1 wherein said keyboard interface means includes alerting means associated with said controller for sounding a soft sonic alert before enablement of normal operation of the computer's security software.

7. An interface for selective prevention of enablement of a computer's security software routine normally operational when no user input to the computer occurs for a period of time, said computer associated with a user manipulated signal input device, said interface comprising:

a presence detector;

a signal input sensor connectable with the signal input device;

and control means associated with said presence detector and said signal input sensor and connectable with the computer, said control means for receiving output from said presence detector indicative of presence or absence of a user of the computer and output from said signal input sensor indicative of the occurrence or nonoccurrence of user input to the computer at the signal input device, and responsive thereto generating a substitute signal to the computer indicative of user input when nonoccurrence of user input to the computer is indicated but presence of the user of the computer is indicated, thereby preventing enablement of the security software routine.

8. The interface of claim 7 further comprising switching means associated with said control means for accommodating receipt of said substitute signal by the computer where indicated, receipt at the computer of user input from the signal input device, or normal operation of the security software routine when both nonoccurrence of user input to the computer at the signal input device and absence of the user are indicated.

9. The interface of claim 7 further comprising a time delay at one of said signal input sensor or said control means for selection of a delay period after cessation of user input to the computer at the signal input device before nonoccurrence of user input to the computer.

10. The interface of claim 7 further comprising alerting means responsive to said control means for signaling that both nonoccurrence of user input to the computer at the signal input device and absence of the user have been indicated.

11. A method for selective prevention of enablement of a computer's security software routine normally operational when no user input to the computer occurs for a period of time, said method comprising the steps of:

sensing presence of a user in a selected vicinity of the computer;

sensing signal input to the computer by the user;

accommodating normal operation of the security software routine when both a lack of signal input to the computer by the user and absence of the user in said selected vicinity of the computer are sensed; and generating a substitute signal to the computer indicative of signal input to the computer by the user when a lack of signal input to the computer by the user is sensed but presence of the user in said selected vicinity of the computer is sensed, thereby preventing enablement of the security software routine.

12. The method of claim 11 further comprising the step of delaying for a selected time period accommodation of normal operation of the security software routine when both a lack of signal input to the computer by the user and absence of the user in said selected vicinity of the computer are sensed.

13. The method of claim 12 wherein the step of delaying accommodation of normal operation of the security software routine includes user selectability of a said time period.

14. The method of claim 11 further comprising the step of indicating that both a lack of signal input to the computer by the user and absence of the user in said selected vicinity of the computer have been sensed before occurrence of normal operation of the security routine.

\* \* \* \* \*